Patented Mar. 25, 1924.

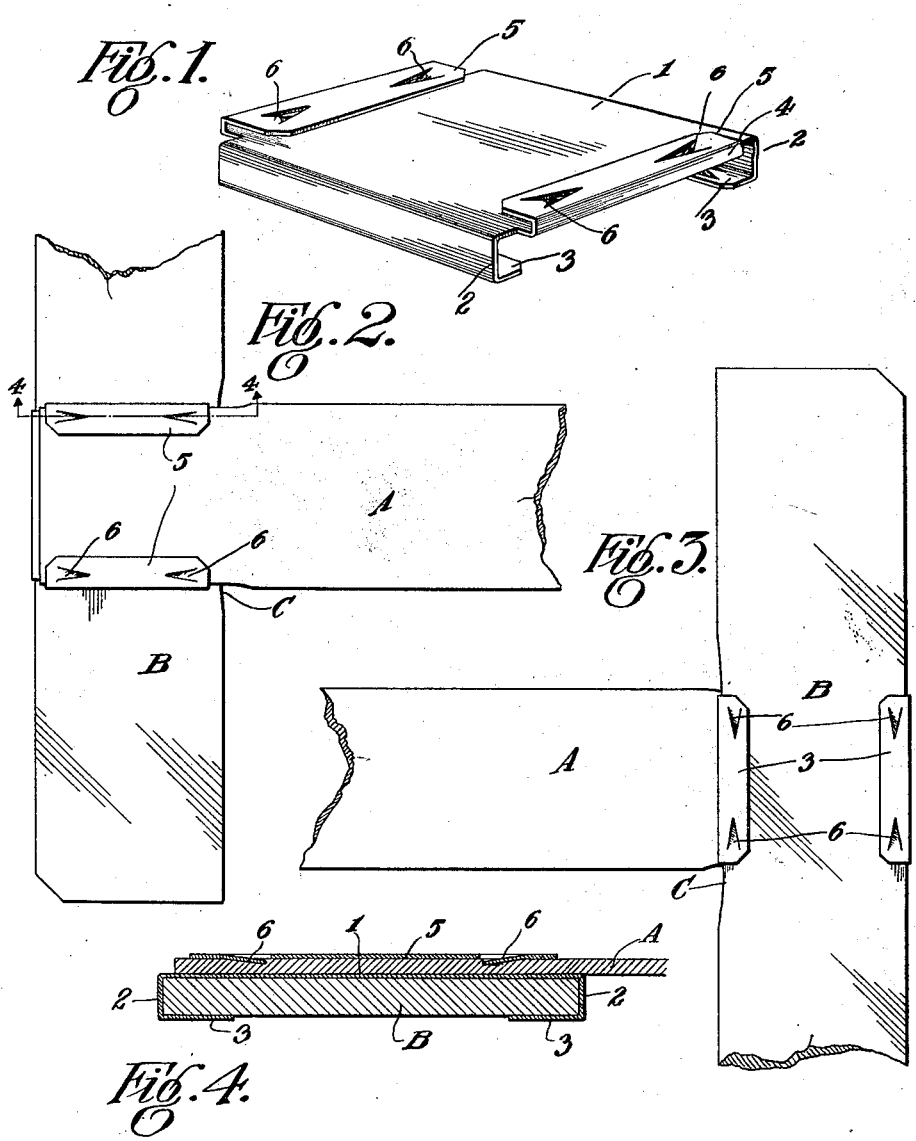

1,488,401

UNITED STATES PATENT OFFICE.

EDWARD M. McCRACKEN, OF SCRANTON, PENNSYLVANIA.

T SQUARE.

Application filed July 12, 1921. Serial No. 484,181.

*To all whom it may concern:*

Be it known that I, EDWARD M. Mc-CRACKEN, a citizen of the United States, residing at Scranton, in the county of Lackawanna and State of Pennsylvania, have invented certain new and useful Improvements in T squares; and I do hereby declare the following to be a full, clear, and exact description of the invention, such as will enable others skilled in the art to which it appertains to make and use the same.

This invention relates to draftsman's T squares and more particularly to a fastening device for use in the construction of such squares.

The object of the invention is to provide a simple efficient and economical device of the character indicated and one that may be readily applied and which will both hold the parts securely in their proper relation and prevent their splitting.

The invention consists in the novel structure, arrangement and combination of parts as hereinafter more particularly described and claimed.

One sheet of drawings accompanies this specification as part thereof in which like reference characters indicate like parts throughout.

Figure 1 is a perspective view of the improved fastener;

Figure 2 is a plan view of the device as applied to a T square, parts of the latter being broken away;

Figure 3 is a bottom view of Fig. 2;

Figure 4 is a sectional view taken on the line 4—4 of Fig. 3.

This invention consists of a cross shaped piece of suitable sheet metal 1, having one pair of oppositely disposed arms bent downwardly as at 2 and inwardly as at 3 and the other pair of oppositely disposed arms bent upwardly as at 4 and inwardly as at 5. In the inwardly disposed parts 3 and 5 V-shaped slits are cut forming prongs 6.

The head part B of the T square is cut away on its inner edge as at C to permit the inner edge of the clamping device to lie flush with the true edge as shown in Fig. 3.

After the parts A and B of the T square have been slipped under the respective down and in turned parts of the clamping device the prongs 6 can be stamped into the wood making a permanent joint. Obviously screws or rivets may be used instead of prongs 6 if desired and the contour of the parts may be varied for ornamental purposes or etched or engraved with scales or other inscriptions.

It will be apparent that the device not only securely holds the parts of the T square in proper relative position but that by securely grasping the edges of these parts which are commonly made of wood, it will prevent their splitting.

Having thus fully described my invention, I claim:

1. A fastening device for T squares and the like comprising a plate of suitable sheet metal having a pair of oppositely disposed projecting arms turned inwardly toward one side of said plate and a second pair of arms turned inwardly toward the opposite side thereof, each arm having a portion parallel with said plate and spaced therefrom and means for securing said inwardly turned portions to an object disposed between the plate and the said inturned portions.

2. A device as described in claim 1, in which the fastening means comprise oppositely directed prongs stamped from said inwardly turned portion of each arm.

3. An improved T square comprising in combination a fastening device as described in claim 1 and two straight edged pieces secured thereby as specified, one of said straight-edged pieces provided with a recess of a depth equivalent to the thickness of the plate from which the fastener is formed, said recess adapted to receive one of the arms of the fastener so that the exposed face of said arm lies in the line of the straight edge.

In testimony whereof I affix my signature.

EDWARD M. McCRACKEN.